May 24, 1949.    B. MILLER    2,471,231
BIRD RETRIEVER
Filed April 4, 1947

INVENTOR.
Benjamin Miller
BY
Victor J. Evans & Co
ATTORNEYS

Patented May 24, 1949

2,471,231

UNITED STATES PATENT OFFICE 2,471,231

BIRD RETRIEVER

Benjamin Miller, Andover, Mass.

Application April 4, 1947, Serial No. 739,521

2 Claims. (Cl. 43—49)

This invention relates to a bird retrieving device for use by sportsmen and hunters.

It is an object of the present invention to provide a retrieving device for recovering ducks, geese and other game birds which have fallen into the water after being shot by the hunter.

Other objects of the invention are to provide a bird retrieving device which is of simple construction, inexpensive to manufacture and efficient in operation.

For other objects and for a better understanding of the invention, reference may be had to the following detailed description taken in connection with the accompanying drawing, in which Fig. 1 is a side elevational view of the retrieving device embodying the features of the present invention.

Figure 1:
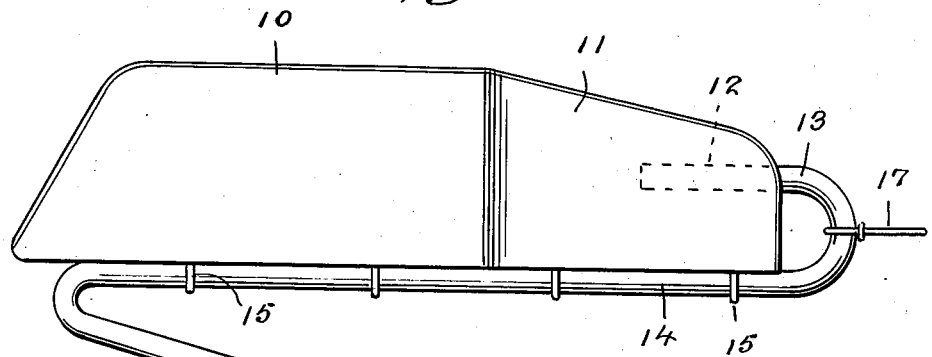
Figure 2:
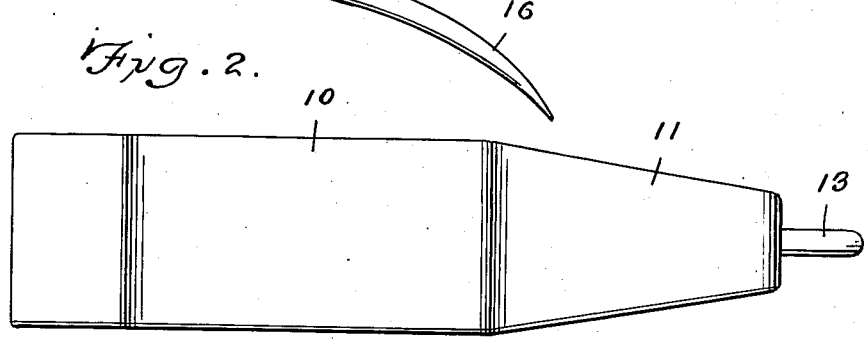
Fig. 2 is a top plan view of the device.
Figure 3:
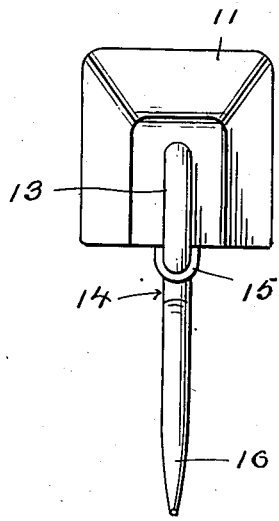
Fig. 3 is a front elevational view of the device.

Referring now to the figures, 10 represents a float made of wood or other material which will float on water and having a forwardly tapered front end 11 with a hole 12 extending therein from its front face. This hole 12 receives a rearwardly bent portion 13 of a hook 14 which is connected to the bottom of the float by staples 15 and which has a forwardly and downwardly extending hook formation 16. The portion 13 when in the hole 12 will prevent the float from twisting to one side or the other of the hook and insures the hook of always being extended in a vertical plane in the water wherein it will be most effective.

The device is so balanced that it can be thrown at any angle, engage the water in any position and will instantly right itself with the hook down and ready to go to work. A line 17 is attached to the bent back portion 13.

To use the device, the line 17 is coiled into loose loops on the ground. While holding the line in one hand, the device is thrown with the other hand toward the bird in the water and is preferably thrown to a point slightly beyond the bird. Thereafter, by slowly pulling the device, the device will be caused to slide upon the bird so that the hook will become attached to the neck or wings of the bird. After a firm engagement has been made of the hook with the bird, the bird can be pulled through weeds, bushes or ice without the same being readily severed from the hook because the harder the hook is pulled the firmer the hook will hold the bird.

Having now described my invention, I claim:

1. A bird retrieving device comprising a float body tapered at its forward end and having a flat bottom and a hook having a straight shank and a bent back portion at one end of the shank and an engaging formation at the opposite end of the shank, the straight portion of said hook being attached to the flat bottom of the float longitudinally thereof so that the engaging formation will extend vertically downwardly therefrom, said float having a hole extending inwardly from its forward tapered end and receiving the bent back portion of the hook whereby to prevent the float from twisting to one side or the other of the hook.

2. A bird retrieving device as defined in claim 1, and said bent back portion of the hook serving as means to which a line can be attached.

BENJAMIN MILLER.

REFERENCES CITED

The following references are of record in the file of this patent:

UNITED STATES PATENTS

| Number | Name | Date |
|---|---|---|
| 952,615 | Harkins | Mar. 22, 1910 |
| 2,106,755 | McArthur | Feb. 1, 1938 |
| 2,185,771 | Mann | Jan. 2, 1940 |
| 2,437,549 | Pecher | Mar. 9, 1948 |
| 2,444,597 | Erickson | July 6, 1948 |